Patented Apr. 7, 1953

2,634,259

UNITED STATES PATENT OFFICE 2,634,259

POLYMERIZATION PROCESS FOR N-VINYL PYRROLIDONE

William O. Ney, Jr., Providence, William R. Nummy, Warren, and Carl E. Barnes, Gloucester, R. I., assignors to Arnold, Hoffman & Co., Incorporated, Providence, R. I., a corporation of Rhode Island No Drawing. Application July 31, 1951, Serial No. 239,624

3 Claims. (Cl. 260—88.3)

This invention relates to a polymerization process wherein N-vinyl pyrrolidone is polymerized in a solvent which is solely or principally water. Polymerized N-vinyl pyrrolidone has marked utility as a blood plasma extender as well as other uses.

An object of this invention is to produce polymerized N-vinyl pyrrolidone as a colorless water solution or as a solid which is readily soluble in water to form a substantially colorless solution.

Another object of the invention is to produce polymerized N-vinyl pyrrolidone as an odorless water solution or as a solid which is readily soluble in water to form a substantially odorless solution.

A further object of the invention is to produce polymerized N-vinyl pyrrolidone as a neutral water solution or as a solid which is readily soluble in water to form a substantially neutral solution.

Vinyl pyrrolidone monomer may be polymerized in bulk or in solution by means of ultraviolet light or by heat in the presence of relatively small amounts of hydrogen peroxide, organic peroxides and other inorganic or organic free radical supplying compounds which are added solely as initiators for the purpose of starting or speeding up the polymerization reaction. It has heretofore been generally accepted that polymerization processes employing such initiators for making this compound required the presence of ammonia or amines (see PB Report No. 25,652, page 5). We have discovered that the use of ammonia during the polymerization is not only unnecessary, but is objectionable, unless carried out in accordance with our discovery hereinafter set forth, due to the formation of impurities as indicated by the presence of color and odor in the solution of the polymer. Such impurities appear to be complexes of acetaldehyde and ammonia, e. g., "acetaldehyde-ammonia" which undergoes further condensation to form colored compounds which also possess an undesirable odor. Furthermore, in the presence of the preferred initiator, namely $H_2O_2$ or equivalent initiator, part of the acetaldehyde is oxidized by the initiator to form acetic acid which imparts undesirable acidity in the final product. In other words, conventional processes of polymerization of the monomer in an aqueous medium in the presence of a peroxide or similar free radical-supplying catalyst and ammonia, results in substantial color, odor, and acidity in the final polymerized product.

We have further discovered that, under the same conditions, but in the absence of ammonia and amines, if the polymerizing solution is maintained within a critical pH range, namely, about pH 4 to pH 10, preferably 7.5 to 9, i. e., on the alkaline side, the objectionable color, odor, and acidity are substantially reduced. For maintaining the polymerization reaction under proper conditions, we have found that it is possible to use innumerable pH controlling agents including buffer mixtures so long as in the instance where refluxing with boiling is used, they will not produce ammonolysis or otherwise objectionably react with the monomer, e. g., form a complex. Additionally, we have discovered that where a distillation process is used with boiling and the vapors continuously and permanently removed from the system, ammonolysis is avoided, and this allows ammonia and amines to be successfully employed. The critical consideration, as will be apparent from our discovery, is to polymerize under conditions to substantially prevent the presence of acetaldehyde and acetaldehyde complexes, whereby color and odor are eliminated from the polymerization product.

The initiator should not exceed about 5% based on the weight of the monomer, and the various pH controlling agents or mixtures of the same including buffer mixtures should not exceed about 15% based on the weight of the monomer. By observing these various critical conditions, polymerization of the monomer in aqueous solution using, except as indicated, either conventional procedures or the processes described in our copending application Serial No. 232,672, filed June 20, 1951 (which we hereby incorporate as a part of this specification), can be readily accomplished to uniformly obtain either an aqueous solution of the polymer or a solid polymer which is substantially odorless and colorless. Aqueous solutions which are substantially neutral and solid polymers which may be dissolved in water and form substantially neutral solutions may be obtained. Our discoveries constitute a complete reversal of former knowledge as taught in the report above referred to wherein it is explained that the use of ammonia and amines with free radical-supplying initiators, e. g., $H_2O_2$, is considered absolutely essential and that use of other alkalies is inoperable.

For the manufacture of blood plasma extender solutions, we may select a pH controlling agent, e. g., disodium phosphate, which is a suitable ingredient for the final isotonic solution. At the end of the polymerization, the solution may be diluted with water to a concentration suitable for blood volume extender use, namely, about 2½ to 7%, whereupon the additional salts required are then added to make up the final solution isotonic to blood. This solution is then sterilized in the conventional manner. The salts can, of course, be added prior to dilution. When the pH control agent is allowed to remain in the polymerized solution, as just described, this solution and the solid product obtained from it will be appreciably alkaline. Similar results will occur with a pH controlling agent which is either on the acid side, or alkaline, and creates an acidic condition, i. e., the polymerized solution or dry solid polymer will be acidic. The pH control agent may, of course, be removed altogether, leaving the polymerized solution and the solid polymer obtained therefrom neutral in some cases, notably where the pH control agent is disodium phosphate or a similar salt, as mentioned above.

As stated above, we have discovered a process wherein ammonia in the presence of a free radical-supplying initiator can be successfully employed in polymerizing N-vinyl pyrrolidone and obtain a colorless and odorless polymer, either in aqueous solution or as a solid and substantially free of acidity. This process is distinguished from the conventional process, as well as processes employing refluxing, in that the polymerization is carried out (a) at the boiling point of the aqueous solution being polymerized, and (b) the condensed vapors are not returned to the solution. By this procedure, acetaldehyde or acetaldehyde-ammonia complex are distilled off and thus permanently removed from the system. In this manner, the factors contributing against producing a colorless and odorless product are eliminated and the problems surrounding the use of ammonia with a free radical-supplying initiator are effectively solved. It will be observed that by polymerizing under conditions to substantially prevent the presence of acetaldehyde and acetaldehyde complexes, color and odor are eliminated from the polymerization product.

It is, therefore, an equally important object of the present invention to accomplish the objects above set forth using ammonia and a free radical-supplying initiator.

The following examples illustrate the objectionable results which occur when ammonia is used with a free radical-supplying initiator according to conventional processes, i. e., where the vapors are returned to the system:

EXAMPLE I

*With ammonia where the vapors are returned to the system*

(a) To 300 parts distilled water which had been boiled in a stream of nitrogen was added 100 parts of vinyl pyrrolidone monomer, and the solution was heated to boiling under refluxing. Two parts ammonia (28% in water) was added followed by 2.1 parts hydrogen peroxide (38%). The exothermic polymerization reaction began immediately and the solution was maintained boiling for 4 to 5 minutes with reflux. When boiling tended to subside, additional heat was introduced and boiling was maintained for 20 minutes. The pH at the beginning was about 10 and after polymerization was about 8.8. The material on drying was found to be slightly yellowish in color, to have a definite odor, and to impart a pH of 4 when dissolved in distilled water.

(b) When the polymerization was conducted at a lower temperature of about 70° C., the time was increased and the polymer showed objectionable color, odor and acidity.

On the other hand, when a process according to our discovery is employed, wherein the vapors are permanently removed from the system, the results are quite satisfactory as illustrated by the following example:

EXAMPLE II

*With ammonia and distillation*

To 30 parts distilled water which had been boiling in a stream of nitrogen was added 100 parts of vinyl pyrrolidone monomer and the solution was heated to boiling. Two parts of ammonia (28% in water) was added followed by 2.1 parts hydrogen peroxide (38%). The exothermic polymerization reaction began immediately and boiling was maintained by application of heat when boiling tended to subside. The condensed vapors in this case were permanently removed as formed, i. e., distilled rather than returned as in refluxing. The resulting solution had pH 5.7 and was essentially colorless and odorless. The spray dried solid was also substantially odorless and colorless.

This example illustrates the objectionable effect of omitting both ammonia and a pH controlling agent.

EXAMPLE III

*Without ammonia or pH controlling agent*

(a) To 300 parts distilled water which had been boiled in a stream of nitrogen was added 100 g. of vinyl pyrrolidone. The mixture was heated to boiling and 1.8 parts of hydrogen peroxide (38%) was added. Boiling was maintained, under reflux, by the exothermic reaction without further addition of heat for five minutes, at which time additional heat was employed and boiling was maintained for 20 minutes. The aqueous solution smelled strongly of acetaldehyde which resulted from hydrolysis of the monomer and had a pH of 3.8, due to oxidation of the acetaldehyde by the initiator. This solution was practically colorless and developed no further color on standing.

(b) At a lower temperature of about 80° C., the odor and acidity were also evident.

The following example is a preferable embodiment of this invention in that a colorless and odorless polymer which is substantially neutral is obtained either in aqueous solution or, as a solid which may be readily dissolved in water. Moreover, the pH controlling agent is one which need not be removed from the polymerized solution for the purpose of forming an isotonic solution and the presence of traces of the agent in the dried solid is, therefore, not objectionable.

EXAMPLE IV

*With pH controlling agent and without ammonia*

(a) To a solution of 3.7 parts of di-sodium phosphate in 300 parts distilled water which had been boiled in a stream of nitrogen was added 100 parts of vinyl pyrrolidone. The pH of this mixture was 9.4. On heating to boiling, under reflux, 2 parts hydrogen peroxide (38%) was added and boiling was maintained by the exothermic polymerization reaction for about 5 minutes, at which point additional heat was applied and boiling was maintained for 20 minutes. The pH of the polymerized solution was pH 7.2. After concentration in vacuum to remove most of the water, the alkalinity controlling agent was precipitated by addition of methanol.

After filtering off the precipitated salt, the filtrate was again concentrated under vacuum to remove the alcohol, then diluted with water to 15% concentration and spray dried. This yielded a practically colorless, odorless solid which is substantially neutral, giving pH of 6.8 on solution in water.

(b) At a lower temperature of about 60° C., the results were the same.

The following example illustrates the use of organic compounds as the pH controlling agent, as distinguished from inorganic compounds as described in Example IV:

EXAMPLE V

*With pH controlling agent and without ammonia*

(a) To a solution of two parts sodium acetate in 300 parts of water which had been boiled under reflux in a stream of nitrogen was added 100 parts of vinyl pyrrolidone. Two parts hydrogen peroxide (38%) was added at the boiling point and boiling under reflux was maintained by the exothermic polymerization which began immediately. Additional heat was applied to maintain boiling for 20 minutes. No odor of acetaldehyde was detected indicating substantially no hydrolysis of the monomer. The solution was colorless and odorless. The pH of the polymerized solution was about 5.7.

(b) The results were the same when polymerization was carried out at 80° C.

(c) When sodium acid phthalate was substituted for sodium acetate, in the foregoing examples, the pH of the polymerized solution was about 4.3, and the polymerized product was colorless and odorless.

The following examples illustrate the use of a pH controlling agent in the form of a buffer mixture:

EXAMPLE VI

*With pH controlling agent, e. g., buffer mixture and without ammonia*

(a) A solution of 2.2 parts of boric acid in 300 parts distilled water, adjusted to pH 9.5 with sodium hydroxide solution, was boiled under reflux in a stream of nitrogen and 100 parts vinyl pyrrolidone was added. Two parts hydrogen peroxide (38%) was added at the boiling point and boiling was maintained by the exothermic polymerization which began immediately. Additional heat was applied to maintain boiling for 20 minutes. The pH during this reaction was maintained between 9.5 and 9.4 throughout. The polymerized solution was colorless and odorless and, after removal of the pH controlling agents, the solution and the dry solid were substantially neutral.

(b) Similar results were obtained at a polymerizing temperature of about 80° C.

EXAMPLE VII

*With pH controlling agent, e. g., buffer mixture and with ammonia*

(a) A solution of 3.7 parts of monosodium phosphate in 300 cc. distilled water, adjusted to pH 7.8 by addition of sodium hydroxide solution, was boiled in a stream of nitrogen. 100 parts of vinyl pyrrolidone was added, and at the boiling point under reflux 2 parts of hydrogen peroxide (38%) was added and boiling was maintained by the exothermic polymerization which began immediately. Additional heat was applied to maintain boiling for 20 minutes. During this reaction the pH was maintained between 7.8 and 7.3 throughout. The results were similar to Example VI.

(b) At a lower polymerizing temperature, e. g., 80° C., the results were the same.

The following example is a simple illustration of conducting the polymerization reaction with distillation to obtain the desirable results of this invention:

EXAMPLE VIII

*With pH control agent and distillation*

To a solution of 3.7 parts of di-sodium phosphate in 300 parts distilled water which had been boiled in a stream of nitrogen was added 100 parts of vinyl pyrrolidone. At the boiling point two parts hydrogen peroxide (38%) was added. The condensed vapors in this case were permanently removed, i. e., distilled off, rather than returned to the reaction vessel as was the practice in the examples above. Similar desirable results were obtained, namely, an odorless, colorless, neutral polymer was produced in aqueous solution or as a solid which readily dissolved in water to form an odorless, colorless, neutral solution.

The following example illustrates the application of this invention to form a blood plasma extender including polyvinyl pyrrolidone. While the example illustrates distillation, the polymerization may take place under refluxing conditions.

EXAMPLE IX

*Blood plasma extender*

Into a flask equipped for distillation was charged 300 parts of distilled water and 3.82 parts of di-sodium hydrogen phosphate ($Na_2HPO_4$). The solution was heated to the point of distillation while passing in nitrogen to displace atmospheric oxygen. There was then added 100 parts of vinyl pyrrolidone and the mixture again heated to the point of distillation and 2.1 parts of 38% hydrogen peroxide added. Boiling continued spontaneously for about 10 minutes. Distillation was continued for an additional 10 minutes by applying heat. At the end of this time, polymerization was essentially complete and a colorless polymeric solution results. There was added to the polymerization mixture 2460 parts of water, plus an additional amount of water equal in volume to the distillate. There was also added 1.03 parts of potassium dihydrogen phosphate ($KH_2PO_4$), 14.28 parts of sodium chloride and enough sodium hydroxide to adjust the solution to the desired pH. After sterilization, the resulting solution is suitable for use as a blood plasma extender.

While we have mentioned $H_2O_2$ as the initiator in the foregoing examples, other free radical suppliers may be used, such as: diacetyl peroxide, benzoyl peroxide, cydehexene peroxide, perbenzoic acid, tertiary butyl peroxide, tertiary butyl hydroperoxide, sodium peroxide (with a buffer such as sodium dihydrogen phosphate), ammonium persulfate, preferably with the distillation process, potassium persulfate, preferably with the distillation process, sodium persulfate, preferably with the distillation process, sodium perborate, preferably with the distillation process, atmospheric oxygen, ozone, azo diisobutyronitrile and lauroyl peroxide.

In referring herein to ammonia, it is, of course, intended to include not only ammonia itself, but amines as well, it being taught by the prior art that unless ammonia or amines are used with free radical-supplying initiators, such as $H_2O_2$, successful polymerization cannot be accomplished. As explained above, we have found the contrary to be true, and, in fact, a wide variety of pH controlling agents and mixtures thereof may be used in the foregoing examples, as illustrated by the following:

The water soluble salts of the following inorganic acids:

| Boric | $Na_3BO_3$; $Na_2HBO_3$; $NaH_2BO_3$ |
| --- | --- |
| Hypochlorous | $NaClO$ |
| Phosphoric | $Na_3PO_4$; $Na_2HPO_4$ |
| Phosphorous | $Na_3PO_3$; $Na_2HPO_4$ |
| Stannic | $Na_2SnO_3$ |
| Sulfurous | $Na_2SO_3$ |

In place of the sodium salts, there may be used the corresponding salts of potassium, ammonium, lithium, magnesium, calcium, strontium and barium.

In addition to the inorganic salts mentioned above, such organic salts as the water soluble sodium, potassium and ammonium salts of mono- and poly-carboxylic acids having an ionization constant of between $10^{-4}$ and $10^{-11}$ may also be employed in the process of the invention. Typical of organic acids, the salts of which may be used, are the aliphatic monocarboxylic acids, such as formic, acetic, propionic, butyric; the mono- and poly-hydroxy acids, such as glycolic, lactic, glyceric, citric, tartaric; the aliphatic dicarboxylic acids typical of which are oxalic, malonic, glutaric, sebacic; and the aromatic acids, such as benzoic, toluic, and o-, m-, and p-phthalic.

With the exception of Example II above, the processes of the examples which follow Example III can be successfully carried out at lower temperatures than boiling and can be successfully carried out either under reflux conditions or with distillation, i. e., permanent removal of vapors from the system, either at boiling temperatures or lower temperatures. In the case of Example II, however, this can only be carried out with the polymerizing solution at boiling and with distillation as indicated. In addition to boiling temperatures, temperatures as low as about 40 to 90° C. are successfully employed with any of the processes according to this invention, except Example III.

We prefer to operate the polymerizing reaction with the solution on the alkaline side, namely, pH 7 to 10 and preferably pH 8, and in the absence of ammonia, and we also prefer to use as the pH controlling agents water soluble salts of organic and inorganic acids having an ionization constant within the range of about $10^{-4}$ to $10^{-11}$ and preferably about $10^{-7}$.

Also, as explained above, not more than about 5% of the initiator should be present in the polymerizing solution and not more than about 15% of the pH control agent should be present during polymerization. At no time will the amounts of these agents ever approach the quantity of the monomer present and in no case should the initiator be of the reducing agent type such as sodium sulphite, as distinguished from the initiators mentioned above, which are denominated for convenience as free radical suppliers.

The maintenance of the pH during polymerization may be accomplished in various ways, notably by providing an operable excess initially of one of the pH controlling agents or a mixture thereof or by adding one or a mixture in limited amounts as required to maintain the proper pH within the range of about 4 to 10.

We claim:

1. The process of polymerizing vinyl pyrrolidone in the presence of a polymerization initiator which is a free radical supplier and ammonia which comprises polymerizing at the boiling point and permanently distilling off vapors containing substantially all of the acetaldehyde and acetaldehyde complexes formed whereby color and odor are eliminated from the polymerization product.

2. The process of polymerizing vinyl pyrrolidone in the presence of a polymerization initiator which is a free radical supplier which comprises polymerizing at the boiling point and permanently distilling off vapors containing substantially all of the acetaldehyde and acetaldehyde complexes formed whereby color and odor are eliminated from the polymerization product.

3. The process of polymerizing vinyl pyrrolidone in the presence of a polymerization initiator which is a free radical supplier and in the presence of a buffering agent which comprises polymerizing at the boiling point and permanently distilling off vapors containing substantially all of the acetaldehyde and acetaldehyde complexes formed whereby color and odor are eliminated from the polymerization product.

WILLIAM O. NEY, JR.
WILLIAM R. NUMMY.
CARL E. BARNES.

REFERENCES CITED

The following references are of record in the file of this patent:

UNITED STATES PATENTS

| Number | Name | Date |
| --- | --- | --- |
| 2,335,454 | Schuster | Nov. 30, 1943 |
| 2,398,926 | Dorough | Apr. 23, 1946 |
| 2,436,926 | Jacobson | Mar. 2, 1948 |
| 2,471,959 | Hunt | May 31, 1949 |

OTHER REFERENCES

Kline, Modern Plastics, November 1945, pages 157–161, 212, 214, 216, 218.